May 13, 1930.  F. S. CARR  1,758,884

FASTENER

Filed Dec. 30, 1926

Inventor:
Fred S. Carr
by Emery Booth Janney & Varney
Atty's

Patented May 13, 1930

1,758,884

UNITED STATES PATENT OFFICE

FRED S. CARR OF NEWTON, MASSACHUSETTS, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

FASTENER

Application filed December 30, 1926. Serial No. 157,969.

My invention aims to provide improvements in three-side lock, snap fasteners.

In the drawings, which illustrate a preferred embodiment of my invention:—

Referring to the embodiment of my invention illustrated by the drawings, I have shown a stud and socket fastener particularly, though not exclusively, adapted for use as a three-side lock fastener for securing the edges of flexible materials together.

Figure 2:
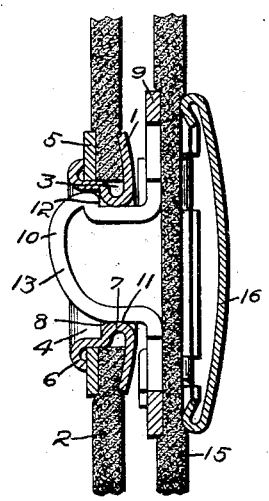
Fig. 2 is a section on the line 2—2 of Fig. 1, the preferred form of socket and support also being shown in cross-section.
Figure 3:
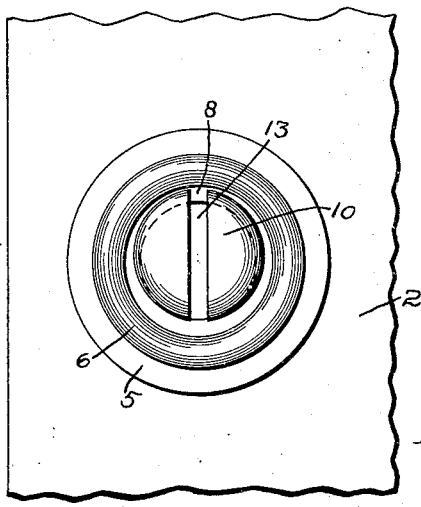
Fig. 3 is an elevation view of the stud and socket installation showing the interlocking engagement between a shoulder on the socket and a shoulder on the stud.
Figure 4:
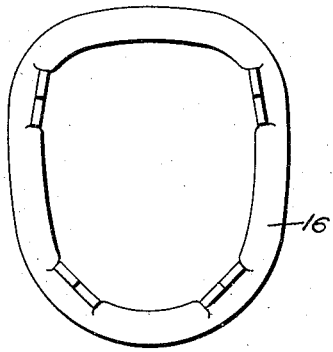
Fig. 4 is a rear elevation of the attaching plate.
Figure 5:
Fig. 5 is a section on the line 5—5 of Fig. 1, showing the manner of attachment of the stud to its support.

The socket member is of the grommet type and has a stud-engaging part having a plate portion 1, which lies against one face of the socket-carrying medium 2 adjacent a hole 3 through the medium 2, as shown in Fig. 2. The center portion of the plate portion 1 is pressed out to form a tubular portion 4, which passes through a hole 3 and through an aperture in a plate 5 located at the opposite side of the carrying medium 2. A portion 6 of the free end of the tubular part 5 is upset and climbed against the plate 5, thereby to hold securely the socket in position with the carrying medium 2. This tubular portion 4 is pressed inwardly adjacent to the plate portion 1 to provide a reduced portion 7 for cooperative engagement with the neck of a stud and the annular shoulder 8 formed in the socket, is adapted to engage a shoulder formed between the head and neck of a stud member.

The stud member illustrated is substantially the same construction and operation as the stud more fully described in my co-pending application Serial No. 81,863, filed January 16, 1926, with the exceptions of the improvements hereinafter described.

Figure 1:
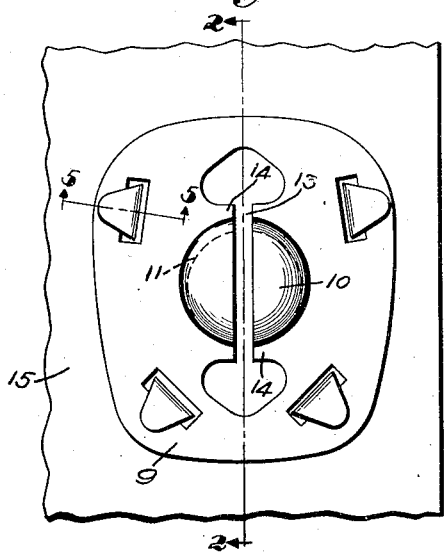
Figure 1 is a rear elevation of the preferred form of stud member.

In this instance, I have provided a stud having a base 9, a head 10, a neck 11 and a relatively abrupt shoulder 12 between the head and neck. This abrupt shoulder is greater at one side (the upper side as viewed in Figs. 1 and 2) than at the other sides and it diminishes so that there is no shoulder at all at the side opposite the greatest overhang. Thus I provide a stud having a head which is offset relative to the neck for the purpose of providing means for preventing separation of the fastener when an outward stress is exerted upon the fastener parts opposite any point where the shoulder 12 is provided. A slit 13 divides the stud head and neck into two resilient portions and the ends of the slit terminate in widened openings in the base to provide, adjacent the connection between each resilient portion and the base, hinge portions 14, 14 which provide for greater resiliency of the stud and prevent "setting" of the resilient portions, as shown in Fig. 1.

The stud may be secured to the stud-carrying medium 15 in any suitable manner, the attaching plate 16 shown being similar to the one shown and described in the above-mentioned application.

When the stud and socket are engaged, as shown in Fig. 2, the shoulder 12 of the stud engages behind the shoulder 8 of the socket, so that the engagement of the two shoulders is in a plane between the faces of the medium 2. Thus when a lateral stress is exerted upon the mediums 2 and 15, in opposite directions, there can be no such tipping action take place between the stud and socket as would result in separation of the fastener.

The fastener which I have shown and described is simple, and durable, and when fastened is locked against separation by any stress except an outward pull adjacent the shoulderless part of the stud.

My invention is not restricted to the particular embodiment shown and described.

Claim:

A grommet installation for cooperative engagement with a snap fastener stud comprising, in combination, a carrying medium, a stud-engaging part having a plate portion of substantial area located at one side of the carrying medium, a tubular portion integral with and extending from said plate portion through a hole in the carrying medium and a plate located at the opposite side of the support against which a portion of the free end of said tubular portion is clenched to secure the said stud-engaging part to the carrying medium, said plate covering substantially the same area as the plate portion of the stud-engaging part and said tubular portion having an abrupt annular shoulder parallel with the plane of the carrying medium and located within the opening through the carrying medium between the two faces of the carrying medium for cooperative engagement with a shoulder on a cooperating stud member.

In testimony whereof, I have signed my name to this specification.

FRED S. CARR.